United States Patent Office 3,231,538
Patented Jan. 25, 1966

3,231,538
ACROLEIN TERPOLYMER
William T. Tsatsos, San Mateo, Calif., assignor to Shell Oil Company, New York, N.Y., a corporation of Delaware
No Drawing. Filed Dec. 23, 1960, Ser. No. 85,949
17 Claims. (Cl. 260—29.7)

This invention relates to new terpolymers and their preparation. More particularly, the invention relates to new high molecular weight terpolymers prepared from unsaturated aldehydes, to their preparation and to their utilization, particularly for the formation of surface coating compositions.

Specifically, the invention provides new and particularly useful terpolymers comprising the product of polymerization of a mixture of (1) an unsaturated aldehyde, and preferably acrolein, (2) a polyunsaturated compound, and (3) a dissimilar ethylenically unsaturated compound, said new terpolymers preferably having an intrinsic viscosity about about 0.1 dl./g.

The invention further provides stable aqueous latices containing the above-described new terpolymers which are particularly useful for the preparation of surface coating compositions, and to a method for their preparation.

As a further embodiment, the invention provides new and useful solvent soluble derivatives of the above-noted high molecular weight terpolymers.

It is known that unstabilized acrolein changes spontaneously into a solid insoluble polymer known as "disacryl." This same insoluble polymer can also be obtained by heating acrolein to high temperatures in the presence of peroxides. These polymers have never acquired any technical importance chiefly because of their insolubility in water and solvents, their thermosetting nature and their low molecular weight.

It is an object of the invention to provide new polymers of unsaturated aldehydes, such as acrolein. It is a further object to provide new terpolymers of unsaturated aldehydes which have high molecular weights. It is a further object to provide new terpolymers which are thermoplastic and can be molded to form valuable plastic products. It is a further object to provide new stable latices of acrolein polymers. It is a further object to provide new terpolymers of acrolein which are particularly useful in the preparation of surface coating compositions. It is a further object to provide terploymer latices which are particularly useful for the treatment of fibrous materials, such as cloth, paper and the like. It is a further object to provide new terpolymers that can be cross-linked. These and other objects of the invention will be apparent from the following detailed description thereof.

It has now been discovered that these and other objects may be accomplished by the new terpolymers of the invention comprising the product of polymerization of a mixture of (1) an unsaturated aldehyde, and preferably acrolein, (2) a polyunsaturated compound, such as butadiene or isoprene, and (3) a dissimilar ethylenically unsaturated compound, said new terpolymers preferably having an intrinsic viscosity above about 0.1 dl./g. It has been found that these special terpolymers have many of the desired properties absent in the prior known disacryl-type polymers. The new terpolymers, for example, have the desired high molecular weight and thermoplastic properties. In addition, many of the terpolymers can be prepared to form stable aqueous latices which can be used for applications, as the preparation of surface coating compositions, treatment of paper, fabrics and the like. In addition, the new terpolymers can be easily converted to solvent-soluble products by treatment with alcohols as shown hereinafter. These solvent-soluble derivatives can be easily molded to form valuable products and can be cured with phenolics and the like to form insoluble infusible plastic materials. The new terpolymers may also be vulcanized to rubbers.

The new surface coating composition prepared from the stable aqueous latices of the invention are particularly outstanding as they can dry in air to form hard very flexible coatings.

The unsaturated aldehydes used in making the new terpolymers are preferably the alpha,beta-ethylenically unsaturated monoaldehydes, such as, for example, acrolein and alpha and beta-substituted acroleins, as methacrolein, alpha - ethylacrolein, alpha - butylacrolein, alpha - chloroacrolein, beta - phenylacrolein, alpha - decylacrolein, alpha-cyclohexylacrolein and the like. Preferred aldehydes to be employed in making the terpolymers include the alpha,beta-monoethylenically unsaturated monoaldehydes containing from 3 to 12 carbon atoms, and especially the unsubstituted monoaldehydes as acrolein and the alkyl, cycloalkyl and aryl-alpha and beta-substituted acroleins containing no more than 8 carbon atoms. 2-alkenals containing up to 8 carbon atoms come under special consideration.

The polyunsaturated compounds used in making the new terpolymers include the polyunsaturated hydrocarbons and halo-substituted hydrocarbons, the polyunsaturated esters, ethers and the like. Examples of these include, among others, open-chain and cyclic conjugated diolefins as isoprene, butadiene, cyclopentadiene, chloropene, 2-cyanobutadiene, and the like as well as divinylbenzene, diallyl and related materials, diallyl phthalate, divinyl ether, diallyl ether, divinyl succinate, divinyl phthalate, allyl vinyl phthalate, ethylene glycol diacrylate, glycerol trimethacrylate, triallyl ether of glycerol, divinyl ether of ethylene glycol and the like. Preferably preferred monomers to be employed include the conjugated dienes containing up to 8 carbon atoms, the alkenyl ethers and ester of polyhydric alcohols containing up to 10 carbon atoms and the polycarboxylic acids containing up to 12 carbon atoms.

The third component to be present include the compounds containing a single $CH_2=C=$ group which is dissimilar to the above-described components, i.e., is free of aldehyde groups. Examples of these include the ethylenically unsaturated hydrocarbons, such as styrene, alpha-methylstyrene, chlorostyrene, allylbenzene, propylene, ethylene, octylene, and the like, unsaturated esters as methyl acrylate, methyl methacrylate, ethyl acrylate, vinyl acetate, vinyl butyrate, vinylbenzoate, allyl benzoate, and the like, unsaturated alcohols and acids as allyl alcohol, methallyl alcohol, methacrylic acid, acrylic acid, crotonic acid, and the like, unsaturated nitriles as acrylonitrile, methacrylonitrile, butyronitrile and the like, unsaturated ethers as vinyl ether, allyl butyl ether, allyl phenyl ether, allyl glycidyl ether, methyl vinyl ketone, ethyl vinyl ketone, unsaturated halides such as vinyl halide, vinylidene halide, unsaturated nitrogen compounds, such as vinylpyridine, vinylpyrrolidone and the like.

Preferred monomers of the above-noted third group include the alkenes and alkenyl-substituted aromatic compounds, and especially the styrenes, the alkenyl esters of monocarboxylic acids, the alkenyl ethers of monohydric alcohols, alkenols, and alkenoic acids, said aforedescribed members each containing no more than 10 carbon atoms.

The amount of the three components to be employed in making the new terpolymers may vary within certain limits. The amount of the unsaturated aldehyde should be from 1% to 90% by weight of the combined mixture of monomers, and preferably from 5% to 85% by weight. The polyunsaturated monomers can vary in amounts of 1% to 80% by weight of the combined mixture, and preferably from 5% to 75%. The dissimilar monomer can vary from about .5% to about 75% by weight of the combined mixture, and preferably from 1% to 65% by weight of the combined mixture. In the above, the proportions should, of course, be adjusted so that the total represents 100%. Particularly preferred terpolymers are those made up from about 1% to 50% by weight of the unsaturated aldehyde, 5% to 60% by weight of the polyunsaturated compound and 15% to 80% by weight of the dissimilar monomer.

The new terpolymers can be prepared by a variety of different methods, such as by exposing the mixture of monomers to high energy ionizing radiation, heating the mixture of monomers with peroxides at low temperatures, exposing the monomers to saturated solutions of neutral salts, such as sodium chloride, or by polymerizing the monomers in a redox polymerization system.

The new terpolymers are preferably prepared by polymerizing the mixture of monomers in an aqueous system using a free radical catalysts and reducing agent preferably at a low reaction temperature. Examples of free radical yielding catalysts that may be employed include, among others, peroxides such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetraline hydroperoxide, phenylcyclohexane hydroperoxide, tertiary-butyl isopropylbenzene hydroperoxide, tertiary butyl peracetate, tertiary butyl perbenzoate, tertiary butyl permalonate, ditertiary butyl perphthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain no more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may be any of the various types of reducing agents. Examples of these include the organic sulfur compounds, such as sulfinic acids or their salts, alpha - oxysulfones, sulfoxylates, alpha - aminosulfones, thioethers which are preferably substituted by a hetero atom such as nitrogen in alpha position, or mercaptans with the simultaneous presence of labile halogen, mono or polyvalent aliphatic alcohols, beta-mercaptoethanol, levulinic acid, sterol compounds, dicyandiamidine, thiobarbituric acid, sulfur dioxide or water-soluble sulfur compounds, and particularly the sulfur dioxide or disulfite derivatives of previously formed polymers of acrolein. Especially preferred reducing agents to be employed include the sulfur dioxide adducts of polyacroleins having an I.V. of at least 0.3 dl./g. and prepared by polymerizing acrolein in a redox catalyst system as described for the preparation of the copolymers of the present invention.

Salts of multivalent metals may also be used as reducing agents in the present process, but their presence is less preferred than the above-described types. By multivalent metal is meant one that can change its valency state reversibly. Examples of such metals, include, among others, iron, manganese, copper, vanadium, cobalt, nickel, tin, silver, titanium, etc. When added to the reaction mixture, the metal must be at least in part in a lower valency state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

Particularly good results are obtained when the anticoalescent agent is included in the reaction mixture. The presence of such materials brings about an increase in rate of copolymerization and maintenance of molecular weight. The agent may be a cationic, anionic or non-ionic material and have a great variety of different compositions. Preferred materials include the ionic agents and especially those having a polar structure including a hydrophilic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, palmityl amine hydrobromide. Additional examples of suitable ionic surface-active agents include the alkali metal or ammonium alkyl or alkylene sulfates or sulfonates, such as sodium and/or potassium lauryl sulfate, alkyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 carbon atoms, and hexitans and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane distearate, polyglycerol dilaurate, inositol monositol monolaurate and the like.

Other examples include the hydroxypolyoxyalkylene ethers of phenols, such as the reaction product of ethylene oxide and/or propylene oxide and phenols as phenol, bisphenol-A, resorcinol, and the like, and mixtures thereof.

Other examples include di- and monoethers of polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nonyl phenyl polyethyene glycol ether, isopropylphenyl polyethylene glycol monoether and the like.

The monomers to be polymerized may be added altogether at the beginning of the reaction or one or more of the monomers may be added in large amounts or in incremental proportions during the course of the reaction. If there is considerable difference in the rate of polymerization of the monomers, it is preferred to add the monomer which is consumed the fastest in small increments during the course of the polymerization reaction.

The temperature employed in the process may vary over a considerable range. It is generally preferred to employ relatively low temperatures. In general, temperatures will vary from the freezing point of the reaction mixture to about 50° C. Preferred temperatures range from about 0° C. to 45° C. Atmospheric, superatmospheric or subatmospheric pressures may be utilized as desired.

The polymerization is preferably effected in an inert atmosphere. This may be preferably accomplished by passing inert gasses, such as nitrogen, methane, etc., into and through the reaction mixture. It is also preferred to distill the monomers under nitrogen before use in the process.

The process may be conducted batchwise or on a semi-continuous or continuous scale.

The product obtained by the above process will appear as latices. When less than about 50% of the copolymer is the unsaturated aldehyde, the latices are surprisingly stable and can be stored for long periods without the copolymer settling out. All the latices can be coagulated to give the solid copolymers as described hereinafter.

The coagulation of the latices to form the solid terpolymers may be accomplished by any suitable method, such as by addition of acids, freezing and the like. After coagulation the solid copolymers may be recovered by filtration, centrifugation and the like.

The terpolymers are solid substantially white products. They preferably have intrinsic viscosities (as determined on the water-solubilized form) of at least 0.1 and preferably 0.5 to 5.0 dl./g. deciliter per gram). These values are determined by the conventional techniques of polyelectrolyte viscosity measurements at 25° C. On a mol weight basis, such polymers have molecular weight ranging from about 10,000 to about 3,000,000 as determined by the light scattering technique.

The new terpolymers are also characterized by the fact that they contain free aldehyde groups or potentially free aldehyde groups. The terpolymers are also characterized by being insoluble in water and insoluble in conventional solvents, such as benzene, toluene, acetone and the like.

Materials such as acetone tend to swell the polymer, but do not dissolve the material. The polymers may be dissolved by reaction with materials as alcohols, mercaptans and the like.

The above-described terpolymers are thermoplastics and may be molded at high temperatures to form plastic articles. Temperatures used in the molding vary from about 90° C. to 300° C., and preferably between 100° C. and 250° C. Pressures employed in the molding may vary from about 3,000 p.s.i. to about 25,000 p.s.i. The moldings are usually transparent and flexible and can be used for a variety of plastic products, such as combs, pencils, etc.

The latices themselves are particularly useful and valuable for the preparation of surface coatings. In this application, the latices may be applied directly to the surface to be coated, such as wood, metal, cement, plaster and the like, and the coating allowed to dry. The resulting films are very hard and flexible and have good resistance to water and the like.

The latices also find use in the preparation of impregnating solutions, treatment of paper, cloth, formation of laminates and the like.

The latices are particularly useful for the treatment of paper to impart water resistance to paper. In this application, the polymers may be applied during the beater stage or as an after-treatment for the paper. Preferably the terpolymer latex is added during the beating stage when the suspension of paper pulp is being rapidly agitated. This addition may be at the beginning of the beater operation or intermittently or at the end of the operation. If the latex is applied to the finished paper, it may be added by spraying, or by rollers or by dipping or running the paper through the conventional padding apparatus.

After latex has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to about 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperatures of the solution may be employed.

The solvent-soluble polymer derivative may be recovered by any suitable means, such as precipitation, evaporation, extraction, distillation and the like.

The solvent-soluble derivatives are in most cases substantially white to light colored solids having substantially the same molecular white as the basic insoluble polymer.

Solvent soluble derivatives of the polymer may be used in the preparation of moldings, coatings and impregnating solutions. The solvent soluble products may also be used as viscosity index improvers for various fluids, such as brake fluids and lubricating oil compositions.

The acetal derivatives obtained by the above-noted reaction with alcohols can be cured with phenolics and other resins to form insoluble castings, coatings and the like.

The new polymers contain residual unsaturation and may be vulcanized to form rubbers or cross-linked by reaction with other polyunsaturated compounds to form valuable insoluble infusible products.

The new terpolymers may, for example, be vulcanized by heating say at temperatures of about 100° C. to 180° C. in the presence of the necessary amount of sulfur and vulcanizing activators and/or accelerators. The amount of sulfur employed will depend largely on the type and activity of the activators and accelerators employed. In most cases, the amount of sulfur employed will vary from about 0.5 to 3.0 parts per 100 parts of rubber.

Any type of known vulcanization activator and accelerator may be used. Examples of conventional activators include, among others, N-cyclohexyl benzothiazole, sulfenamide, N-cyclohexyl thiazoline sulfenamide, 4,5-dimethyl-2-mercaptothiazole, zinc dibutyl dithiocarbamate, the zinc salt of mercaptobenzothiazole and the like, and mixtures thereof. The accelerators are preferably used in amounts varying from about 0.5% to 2% by weight of the rubber. Examples of accelerators include, among others, 2-mercaptodiazodisulfide, zinc dibenzyl dithiocarbamate, diphenylquanidine acetate, zinc butyl xanthrate, dibenzylamine and the like, and mixtures thereof. These accelerators are preferably employed in amounts varying from about .1 part to 5 parts per 100 parts of rubbery polymer.

Other materials may also be included, such as anti-oxidants, anti-scorch agents, carbon blacks, metal oxides, pigments, oil extenders and the like.

The compounding may be accomplished by merely mixing the components together in a suitable reactor. In general practice, the rubber is preferably mixed with the sulfur, accelerators, activators, oil extenders and the like, and this mixture is then employed in the desired molding and forming operations.

The above-noted vulcanizable mixtures may be utilized for the formation of many valuable materials, such as tires, toys, mats, tubes and the like.

The new polymers may also be epoxidized with peroxidizing agents such as peracetic acid to form valuable polyepoxide materials that may be cured to insoluble products by reacting with active hydrogen-containing materials as amines and acids, and with anhydrides, BF₃-complexes, metal salts and the like.

To illustrate the manner in which the invention may be carried out, the following examples are given. It is to be understood, however, that the examples are for the purpose of illustration and the invention is not to be regarded as limited to any of the specific materials or conditions recited therein. Parts are parts by weight.

*Example I*

This example illustrates the preparation and use of a terpolymer of acrolein, styrene and isoprene.

To a glass reactor were added the following components in the order indicated: 110 parts of styrene and 1 part of sulfonate of dioctyl succinate, 60 parts of isoprene and 30 parts of acrolein. To this was added 200 parts of water, 4.4 parts of a 9% solution of a polyacrolein-sulfur dioxide adduct and 40 parts of 0.05 M aqueous solution of tertiary butyl hydroperoxide. The peroxide was added dropwise over .5 hour. The mixture was kept at 25° C.– 30° C. overnight in the presence of nitrogen and with stirring. The resulting product was a white latex.

The latex was cast on tin panels to form a thin film. The film dried in air to form a hard flexible coating.

A portion of the above-noted latex was added to water to form padding solutions of 1%, 5% and 10% and the solutions used to impregnate bleached kraft paper. After drying, the paper was tested for strength and water resistance. The paper treated in each case showed improved strength and water repellancy.

Coagulation of the latex with acetone gave a white solid terpolymer. Analysis indicated the product was a terpolymer made up of 55% styrene–30% isoprene and 15% acrolein. The polymer could be molded at 175° C. and 15,000 p.s.i.

1 part of the terpolymer was mixed with 40 parts of methanol, 160 parts of ethyl dichloride and .2 part of p-toluenesulfonic acid and the mixture stirred. In a short while, the terpolymer dissolved. The mixture was evaporated to recover the solid acetal derivative. This polymeric acetal was molded at 150° C. to give a hard plastic product.

*Example II*

Example I was repeated with the exception that the proportions of monomer were changed to 80 parts acrolein, 80 parts styrene and 40 parts isoprene. The resulting product was a thick latex which was coagulated by the addition of acetone. The resulting product was a white solid terpolymer containing 40% acrolein, 40% styrene and 20% isoprene. The terpolymer was molded at 100° C. and 15,000 p.s.i. to give a clear transparent molding.

The above-noted latex before coagulation was cast out on tin panels and air dried. The resulting films were hard and flexible.

*Example III*

Example I was repeated with the exception that the proportions of monomer were changed to 40 parts acrolein, 120 parts isoprene and 40 parts styrene. The resulting product was an aqueous latex which could be coagulated by the addition of acetone. The resulting product was a white solid terpolymer containing 60% isoprene, 20% acrolein and 20% styrene.

The above-noted latex before coagulation was cast out on tin panels and dried. The film was hard and clear.

The above-noted latex was also used to impregnate bleached kraft paper as in Example I. The resulting paper had improved strength and water repellancy.

*Example IV*

Example I was repeated with the exception that the proportions of monomer were changed to 160 parts isoprene, 20 parts acrolein and 20 parts styrene. The resulting product was white latex. The latex was spread out on tin panels and dried. The resulting films were hard and flexible.

The above-noted latex was coagulated by the addition of acetone and the white powder identified as a terpolymer of 80% isoprene, 10% acrolein and 10% styrene. This terpolymer was molded at 150° C. to form a hard plastic molding. The terpolymer was also treated with methanol as in Example I to form the polymeric acetal derivative. This solid material could also be molded to form rubbery plastic products.

*Example V*

The preceding example was repeated with the exception that the proportions of monomer were changed to 140 parts styrene, 30 parts acrolein and 30 parts isoprene. The resulting product was thick latex which was coagulated to give a white solid terpolymer containing 70 parts styrene, 15 parts acrolein and 15 parts isoprene. The terpolymer was molded at 150° C. to give a light yellow transparent molding.

Example VI

Example I was repeated with the exception that the proportions of monomer were changed to 100 parts acrolein, 50 parts styrene and 50 parts isoprene. The resulting product was a thick latex which was coagulated with acetone. The resulting white solid polymer was identified as a terpolymer of 50 parts acrolein, 25 parts styrene, 25 parts isoprene. The terpolymer was molded at 150° C. to give a light brown transparent molding.

Example VII

Example I was repeated with the exception that the proportions of monomer were changed to 140 parts of isoprene, 30 parts of styrene and 30 parts of acrolein. The resulting product was a thick latex which was spread out on tin panels and dried to give a colorless, transparent very flexible film.

Coagulation of the latex with acid gave a white solid terpolymer which was identified as containing 70% isoprene, 15% acrolein, 15% styrene. This product could be molded at 150° C. to form a plastic molding.

Example VIII

Example I was repeated with the exception that the proportions of monomer were changed to 160 parts of acrolein, 20 parts of styrene and 20 parts of isoprene. The resulting product was a latex which was filtered to recover a white solid terpolymer. The terpolymer made up of 80% acrolein, 10% styrene and 10% isoprene was molded at 100° C. and 15,000 lbs. to give a clear yellow transparent plastic molding.

Example IX

This example illustrates the preparation and use of a high molecular weight terpolymer of acrolein, allyl alcohol and isoprene.

To a glass reactor were added the following components in the order indicated. 50 parts of acrolein, 20 parts of allyl alcohol and 130 parts of isoprene. To this mixture was added 200 parts of water, 4.4 parts of 9% polyacrolein-sulfur dioxide adduct and 40 parts of 0.05 M tertiary butyl hydroperoxide. The peroxide was added dropwise over a ½ hour period. The reaction was stirred under nitrogen at 25–30° C. over night. The resulting product was an aqueous latex. The latex was spread out and dried on tin plates. The resulting films were hard and very flexible.

The above latex was coagulated by the addition of acetone and the polymer, identified as a terpolymer of 65% isoprene, 25% acrolein and 10% allyl alcohol, was recovered and molded at 150° C. The resulting product was a hard flexible molding.

Example X

The preceding example was repeated with the exception that the proportions were changed to 100 parts of isoprene, 40 parts of allyl alcohol and 60 parts of acrolein. The resulting product was an aqueous latex. The latex was spread out and dried on tin plates. The resulting films were hard and very flexible.

The above latex was coagulated by the addition of acetone and the white polymer, identified as a terpolymer of 50% isoprene, 20% allyl alcohol and 30% acrolein, was recovered and molded at 150° C. The resulting product was a hard flexible molding.

Example XI

Examples I to X are repeated with the exception that the isoprene is replaced with butadiene. Related results are obtained.

Example XII

Examples IX and X are repeated with the exception that the allyl alcohol is replaced with acrylonitrile and methyl acrylate. Related results are obtained.

Example XIII

Example IX was repeated with the exception that the proportions were changed to 160 parts of isoprene, 20 parts of allyl alcohol and 20 parts of acrolein. The resulting product was a stable aqueous latex. The latex was spread out and dried on tin plates. The resulting films were hard and very flexible.

The above latex was coagulated by the addition of acetone and the white polymer, identified as a terpolymer of 80% isoprene, 10% allyl alcohol and 10% acrolein, was recovered and molded at 150° C. The resulting product was a hard flexible molding.

Example XIV

Example IX was repeated with the exception that the proportions were changed to 180 parts of isoprene, 10 parts of allyl alcohol and 10 parts of acrolein. A terpolymer of 90% isoprene, 5% allyl alcohol and 5% acrolein was obtained.

Example XV

Example IX was repeated with the exception that the proportions were changed to 140 parts of acrolein, 20 parts of allyl alcohol and 40 parts of isoprene. The resulting mixture was filtered to recover a white polymer identified as a terpolymer of 70% acrolein, 10% allyl alcohol and 20% isoprene. The white powder was molded at 150° C. and 15,000 lbs. to form brown opaque casting.

Example XVI

Examples IX and X are repeated with the exception that the isoprene is replaced by butadiene. Related results are obtained.

Example XVII

To a glass reactor were added the following components in the order indicated: 50 parts of styrene and 1 part sulfonate of dioctyl succinate, 100 parts isoprene and 50 parts of acrolein. To this was added 200 parts of water, 4.4 parts of 9% aqueous solution of polyacrolein-sulfur dioxide adduct and 40 parts of 0.05 M solution of tertiary butyl hydroperoxide. The peroxide was added dropwise over a period of about ½ hour. The mixture was kept at 25–30° C. overnight in the presence of nitrogen and with stirring. The resulting product was a thick latex. The latex was coagulated by adding acetone to form a white solid polymer. Analysis indicated the product was a high molecular weight terpolymer of 50 parts isoprene, 25 parts styrene and 25 parts acrolein.

The above-noted terpolymer was molded at 175° C. and 15,000 lbs. to give a translucent somewhat rubbery molding.

Example XVIII

The latex disclosed in Examples I to IV are heated with sulfur to form rubbery cross-linked products.

I claim as my invention:

1. A high molecular weight terpolymer of (1) acrolein, (2) a polyethylenically unsaturated monomer, and (3) a dissimilar ethylenically unsaturated monomer containing the $CH_2=C=$ group, said terpolymer having an intrinsic viscosity of between 0.5 and 5.0 dl./g. and the amount of acrolein varies from 2% to 90% by weight of monomers being polymerized.

2. A solid water-insoluble high molecular weight terpolymer of (1) acrolein, (2) a polyethenically unsaturated monomer, and (3) a dissimilar ethylenically unsaturated monomer containing the $CH_2=C=$ group, said terpolymer having an intrinsic viscosity between 0.1 and 5.0 dl./g., the amount of acrolein varying from 2% to 90% by weight of the monomers being polymerized.

3. A water-insoluble high molecular weight terpolymer of (1) acrolein, (2) a conjugated diene, and (3) a dissimilar ethylenically unsaturated monomer containing the $CH_2=C=$ group, said terpolymer having an intrinsic viscosity between 0.3 dl./g. and 5.0 dl./g., the amount of acrolein varying from 2% to 90% by weight of monomers being polymerized.

4. A terpolymer as in claim 3 wherein the dissimilar unsaturated monomer is an alkenyl-substituted aromatic hydrocarbon.

5. A terpolymer as in claim 3 wherein the dissimilar unsaturated monomer is styrene.

6. A terpolymer as in claim 3 wherein the dissimilar unsaturated monomer is allyl alcohol.

7. A terpolymer as in claim 3 wherein the dissimilar unsaturated monomer is methyl acrylate.

8. A terpolymer as in claim 3 wherein the dissimilar unsaturated monomer is acrylonitrile.

9. A terpolymer as in claim 3 wherein the amount of the conjugated diolefin varies from 10% to 80% by weight of the monomers being polymerized.

10. An aqueous latex of a water-insoluble high molecular weight terpolymer of (1) acrolein, (2) a conjugated diene, and (3) an ethylenically unsaturated monomer containing a $CH_2=C=$ group, said monomer being selected from the group consisting of alkenyl-substituted aromatic hydrocarbons, alcohols, esters, ethers and ketones, said terpolymer having an intrinsic viscosity between 0.1 and 5.0 dl./g. and containing from 2% to 90% by weight of polymerized acrolein.

11. A stable aqueous latex of a terpolymer of (1) acrolein, (2) a conjugated diene, and (3) styrene, said terpolymer having an intrinsic viscosity between 0.5 and 5.0 dl./g. and the amount of acrolein varying from 2% to 90% by weight of the monomers being polymerized.

12. Products defined as in claim 3 wherein the diene is isoprene.

13. A terpolymer as in claim 3 wherein the diene is butadiene.

14. A process for treating fibrous materials to improve their properties which comprises applying to the said material an aqueous latex of a terpolymer of (1) acrolein, (2) a polyethylenically unsaturated monomer, and (3) a dissimilar ethylenically unsaturated monomer containing the $CH_2=C=$ group, said terpolymer having an intrinsic viscosity between 0.1 and 5.0 dl./g. and the amount of acrolein varying from 2% to 90% by weight of the monomers being polymerized.

15. A process for treating paper to impart water resistance thereto which comprises treating the paper with an aqueous medium containing a terpolymer of (1) acrolein, (2) a conjugated diene, and (3) styrene, said terpolymer having an intrinsic viscosity between 0.5 and 5.0 dl./g. and the amount of acrolein varying from 2% to 90% by weight of the monomers being polymerized.

16. A process for preparing high molecular weight terpolymers containing polymerized acrolein units which comprises mixing (1) acrolein, (2) a polyethylenically unsaturated monomer, and (3) a dissimilar ethylenically unsaturated monomer containing the $CH_2=C=$ group, together in an aqueous medium in the presence of a free radical yielding catalyst and a reducing agent at a temperature below about 50° C.

17. A process for preparing high molecular weight terpolymers containing polymerized acrolein units which comprises reacting (1) acrolein, (2) a conjugated diene, and (3) an ethylenically unsaturated monomer containing a $CH_2=C=$ group, said monomer being selected from the group consisting of alkenyl-substituted aromatic hydrocarbons, alcohols, esters, ethers and ketones, together in an aqueous medium in the presence of a peroxide catalyst and a water-soluble sulfur-containing reducing agent at a temperature below about 50° C.

References Cited by the Examiner
UNITED STATES PATENTS

| | | | |
|---|---|---|---|
| 2,651,624 | 9/1953 | Swart | 260—73 |
| 2,657,192 | 10/1953 | Miller et al. | 260—73 |
| 2,748,049 | 5/1956 | Kalafus | 260—73 |
| 2,905,656 | 9/1959 | Chapin et al. | 260—73 |

MURRAY TILLMAN, *Primary Examiner.*

DANIEL ARNOLD, LEON J. BERCOVITZ, WILLIAM H. SHORT, *Examiners.*